May 19, 1959 H. G. E. L. DE RYCKER ET AL 2,887,365
CATALYTIC REACTOR
Filed Jan. 31, 1956
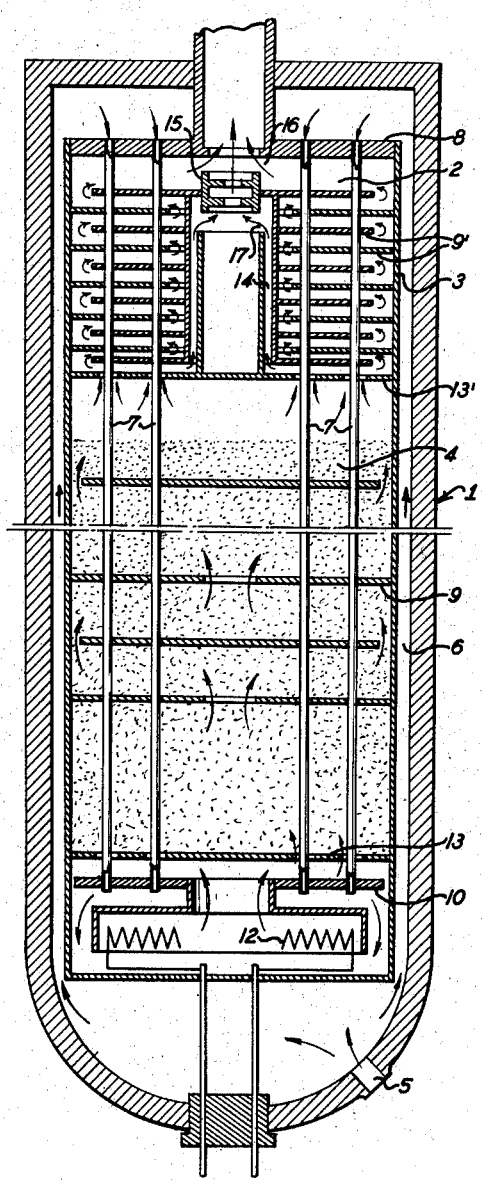

United States Patent Office 2,887,365
Patented May 19, 1959

2,887,365
CATALYTIC REACTOR

Henry Gustave Etienne Leon De Rycker, Cointe-Sclessin, and Michel Fernand Vith Ghislain Mathieu, Embourg, Belgium, assignors to Societe Belge de l'Azote et des Produits Chimiques du Marly, Liege, Belgium Application January 31, 1956, Serial No. 562,531
Claims priority, application Belgium February 21, 1955
8 Claims. (Cl. 23—288)

This invention relates to heterogeneous catalytic reactions and to reactor means for use in carrying on such reactions.

It is an object of the present invention to provide an improved reactor for heterogeneous catalytic reactions, such as ammonia or methanol syntheses, or the hydrogenation of various organic materials or any other catalytic reactions between gaseous or liquid fluids.

More particularly, but not exclusively, this invention is concerned with reactors constituted by an outside container capable of resisting the pressures at which the reactions are effected, and referred to hereinafter as a "force-resisting tube," in which another container is inserted in known manner, the latter container being referred to hereinafter as a catalytic reaction cartridge. This cartridge essentially comprises a tubular heat-exchanger and a reaction chamber. The catalyst is contained above and between transverse baffles and surrounds the heat-exchanger tubes. The two co-axial containers are separated from each other by an annular intermediate space.

In view of the simultaneous action of the powerful chemical reactions and of the severe mechanical stresses resulting from the compression, expansion and other similar effects which occur at the elevated temperatures of the various catalytic processes, the cartridges of these reactors are very subject to damage by deformation and breakage, in particular, of their inside parts. Thus, the tubes of the heat-exchange system have a tendency to be deformed, and even broken due to the effect of their thermal expansion, which is opposed by the rigidity of the assembly elements to which the extremities of the heat-exchange tubes are fixed.

For these reasons, the dissembling of such reactors without damage thereto, and the repeated use of the inside elements of the cartridges, often becomes difficult and even impossible, which causes high costs for maintenance and renewal.

Furthermore, the breaking of these inside elements at the beginning and during the course of a reaction is very damaging to good operating conditions for the cartridges. Thus, in causing deviations of the gaseous current, these breaks may cause in some parts super-heating which is damaging both to the reaction and to the catalyst, and, in other parts, an insufficient heating of the catalyst, which also reduces the production capacity.

A further difficulty may be encountered in cartridges in which heat-exchange takes place between gaseous reactants and gaseous products. In certain strongly exothermic catalytic reactions, a local excess of heat may occur, e.g. the reactants or flowing gases are too strongly heated by heat-exchange with the bulk of the products. In order to avoid such overheating, which has a damaging effect both on the activity of the catalyst and on the reaction, the temperature of the catalyst in the various zones of the reaction chamber should be regulatable in a precise and continuous manner by means of part of or all of the heat evolved by the reaction. In a catalytic cartridge operating under desirable thermodynamic conditions, the temperature diagram for the gas flowing through the cartridge should have a precise form according to the particular catalysis to be effected. Furthermore, the inevitable changes due to the expansion of the various elements should not modify the gaseous circuit. For this purpose, the parts within the cartridge and, in particular, the heat-exchange tubes should be capable of free expansion, without hindering the operation of the cartridge and without causing deformation or breaks.

However, none of the usual types of cartridges satisfies these conditions. In simple, and even rudimentary, cartridges which are consequently relatively robust, the thermodynamic conditions are not respected. The temperatures are generally unequal in the zones in which they should not vary from one point to another, so that local overheating is caused. This overheating may initiate secondary reactions which detract from the products to be obtained and have a bad effect on the catalyst, resulting, respectively, in low yields and limited catalytic activity. In spite of their simplicity, these cartridges are really delicate and cannot easily be used with important changes in operating conditions or in the purity of the gaseous reactants.

In other types of cartridges which have been better designed with reference to the desirable thermodynamic conditions, the assembly is most often not entirely sealed and, in general, these cartridges cannot be recuperated or re-used after a single pass or use. This disadvantage is encountered, for instance, with the so-called "quench-type" cartridges, both in the case in which the quenching is carried out by injection of the cold, gaseous reaction mixture, and in the case in which the quenching is produced by means of another fluid which does not mix with the gaseous reactants.

In both cases, the expansion causes deformation and breaking, which, in increasing the irregularity in the temperature distribution, cause still greater deformations, so that, in practice, the effect is that of a vicious cycle in which the defects are mutually amplified.

It is an object of the present invention to avoid these disadvantages by an improved arrangement of the various elements constituting the catalytic cartridge. For this purpose, in accordance with one embodiment of invention, the following precautions are taken:

In order to avoid the deformation and breaking of parts within the cartridge, the assembly of tubes which acts as the heat-exchanger is constituted by tubes made in one piece which are fixed in a sealed and rigid manner at only one of their extremities, and which entirely traverse the compartment constituting the heat-exchanger proper and the compartment constituting the reaction chamber. In addition, the circular apertures in all the transverse elements (baffles, etc.) for receiving the tubular assembly have a slightly larger diameter than that of the tubes, so that these tubes can freely expand without any hindrance within these apertures.

As for the baffles, they can, for the same purpose, be made of a metal which is more ductile and consequently more plastic than the metal of the tubes, e.g. of red copper, and they can be maintained in position by means of links which do not squeeze the baffles, the hard metal links being also replaceable wholly or partly by resilient springs. The hard metal baffles may also be welded to some of the tubes so as to be displaceable with the tubes without deforming them or without being themselves deformed.

In order to avoid the disadvantages which may result from a general overheating of the catalyst by exchange of heat between the reactants and the products, the compartment which acts as a heat-exchanger and which may possess baffles in which the catalyst or an inert granular material may be housed or which may also be a tubular heat-exchanger with concentric tubes, preferably possesses by a by-pass conduit with a regulatable flow. This conduit allows gases to be brought onto the catalyst at an appropriate temperature, either by causing only a part of the hot, treated gases to enter the heat-exchanger after catalysis, or by causing only a part of the cold gases to be treated to enter the heat-exchanger tubes before catalysis.

Since the control is thus effected after or before the passage of the gaseous mixture over the catalyst, the tubes of the tubular assembly can be constructed in one piece in such manner that the whole of the gaseous mixture must necessarily traverse the whole catalytic layer and that any undesirable communication between the gases circulating respectively inside the tubes and outside the tubes is avoided.

Finally, in order to achieve in the catalytic chamber temperature conditions which are favorable to the reaction, i.e. for example, for ammonia a temperature curve having a maximum near the beginning and, for methanol, a rapidly ascending curve ending in a long, horizontal portion, the spacing of the baffles should preferably not be uniform, but should increase from the first of the baffles in the direction of movement of the gaseous current towards the heat-exchanger. The position of the first baffle depends on the reaction to be effected, and the operating conditions which are imposed, for instance, by the pressure within the reactor. Since the rate of heat-exchange in the reaction chamber and in the heat-exchanger is influenced by the spacing between the baffles and is increased by decreasing this distance, the baffles are placed at relatively great distances from each other in the reaction chamber, in which too high a heat-exchange rate might be undesirable and at smaller distances from each other in the baffled heat-exchanger, the essential function of which consists in providing a heat-exchange between the gaseous product mixture which is being withdrawn after catalysis and the gaseous reactants which are to be pre-heated before the catalytic reaction.

The accompanying drawing represents diagrammatically a reactor according to one embodiment of the invention. The description and the operation of this reactor will next be described by way of example:

A catalytic reactor comprises a catalytic reaction cartridge contained within a force-resisting tube 1, the walls of the cartridge and of the tube forming a double wall for the reactor. This cartridge essentially comprises two compartments, the upper compartment constituting a heat-exchanger proper 2, and the adjacent lower compartment, which also acts as a heat-exchanger, forming a reaction chamber 4 containing the granular catalyst. The grain size of the catalyst is determined by its mode of preparation, by the operating conditions of the catalysis to be effected, by certain characteristic dimensions of the cartridge itself, or, finally, by a combination of any of these factors.

The catalytic reaction is effected in the cartridge which is thus constituted within the force-resisting tube 1 by the heat-exchanger 2 and the reaction chamber 4, after the pre-heating of the reaction mixture in a tubular assembly 7 by the passage of the gases through the catalyst in the reaction chamber 4.

For this purpose, the gaseous mixture to be treated is introduced into the base of the force-resisting tube 1 through an opening 5 and is conducted towards the upper end of the cartridge through the free space 6 between the walls of the force-resisting tube 1 and the cartridge. This fulfills the double function of protecting the force-resisting tube 1 against excessive heating, and of slightly pre-heating the reaction mixture.

At the top of the cartridge, the gaseous mixture enters the tubes 7 of the tubular heat-exchange nest. These tubes are constructed of one piece only and traverse longitudinally the heat-exchanger 2 and the reaction chamber 4.

In order to allow the longitudinal expansion of the tubular nest without any risk of deformation of the tubes 7 by incurvation, the latter tubes are only fixed in a rigid and sealed manner at their upper extremities, for instance by screwing, squeezing, welding or other appropriate means. The tubes are fixed to an upper plate 8 having circular openings corresponding to the diameters of the tubes, and which separates the top of the cartridge from the empty space between the force-resisting tube 1 and the cartridge. The tubes 7 which are thus rigidly secured in the plate 8 are thus suspended therefrom.

On the other hand, most of the tubes 7 freely traverse the baffles 9' and 9 of the heat-exchanger 2 and the reaction chamber 4, respectively, the grating baffles 13' and 13, and the lower plate 10; while a few of the tubes 7 carry the baffles 9' and 9, which are secured to these few tubes 7, but otherwise are free to move with respect to the cartridge and with respect to the most of the tubes 7. These transverse elements have corresponding circular apertures which are slightly larger in diameter than the tubes, so that the tubes can expand without any hindrance. In order to ensure a large, well-distributed and efficient heat-exchange surface, and in order that the useful volume of the inner container occupied by the catalyst should be reduced as little as possible, tubes 7 of small diameter are preferably employed.

The gaseous reactant mixture is progressively heated by its passage from top to bottom through the tubular assembly, whilst the catalyst surrounding the tubes is correspondingly cooled. The gaseous reactant mixture and the catalyst are thus both substantially at the temperature which is most favorable to the reaction. By this pre-heating of the reaction mixture, the temperature of the latter, on arrival over the catalyst, is preferably made slightly higher than the desired initial reaction temperature. This condition can be achieved by withdrawing part of the gases from the zone in which they pass from the reaction chamber to the heat-exchanger by means of a by-pass tube 14 which will be further discussed below.

The gaseous reaction mixture which has been pre-heated to the right temperature passes into an intermediate chamber 11, after leaving the heat-exchange tubes 7. This intermediate chamber contains an electrical resistance heater 12 for raising the temperature of the gaseous reaction mixture to a point sufficient to initiate the reaction. The gaseous reaction mixture then enters from below the reaction chamber 4 containing the granulated catalytic mass, and the exothermic catalytic reaction which has been initiated at the lower part of the reaction chamber occurs throughout the reaction chamber incident to the contact between the reaction mixture and the catalytic granules.

The free spaces between the tubes 7 and the grating baffles 13 and 13' allow the passage of the gases but are small enough not to allow the catalytic granules to pass through them in substantial amount. In order that the differences in temperature between the core of the reaction chamber and its wall 3 should be reduced, that a favorable heat-exchange rate with the tubes 7 should be obtained, and that local overheating of the catalyst should be avoided, the reaction mixture is conducted in a zig-zag manner through the reaction chamber 4 towards the heat-exchanger 2 by means of transverse baffles 9, between which the catalyst is housed.

In order that, under the effect of temperature expansion, the tubes 7 should be able freely to move within the baffles 9 of the reaction chamber and the baffles 9' of the heat-exchanger, these baffles do not press on the tubes. However, particularly in the heat-exchange compartment 2, the tolerance between the tubes and the apertures therefor within the baffles must be such that the efficiency of the heat-exchange is not impaired.

The spacing of the baffles, which is unequal and varies according to the catalysis to be effected, determines the manner in which the temperature varies along the catalytic layer. The heating of the latter can be regulated by means of an appropriate pre-heating of the reaction mixture within the heat-exchanger 2. The latter contains, for this purpose, a by-pass 14, the flow through which is regulatable by means of a gate-valve 15. This valve is such that it is operatable from outside the reactor and can be displaced parallel to the axis of the cartridge. The valve allows the passage 16 leading from the heat-exchanger 2 to the outside of the reactor to be enlarged or narrowed, and the passage 17 leading directly from the reaction chamber 4 to the outside to be correspondingly narrowed or enlarged at the same time, and allows one of these passages to be closed while the other is kept open. In this manner, the proportion of hot gas to be withdrawn from the reactor can be regulated as desired by its passage into the heat-exchanger 2, so that the temperature of the gases conducted onto the catalyst can be controlled.

It will be understood that certain modifications can be effected to the reactor which has just been described by way of example with reference to the drawing, without, however, altering the principle and the characteristics of the invention. Thus, amongst other modifications, the electrical resistance heater for bringing the reaction mixture to a temperature sufficient to initiate the reaction may be situated elsewhere than in the intermediate chamber 11, for instance, at the center of the reaction chamber base within the catalyst itself, or outside the reactor. Alternatively, the final heating of the gaseous mixture by other means than an electrical resistance heater.

As for the regulation of the temperature of the gas entering the reaction chamber by means of the heat-exchanger 2, other by-pass means either for the entering gas or for the gas leaving the reaction chamber may obviously be used without the principle of the invention being affected. In the same way, it is obvious that the characteristics of the invention allowing a free expansion of the tubular assembly by the rigid fixing of the tubes at one of their extremities only and by the adoption of circular apertures in the baffles and other transverse pieces having a diameter slightly larger than that of the tubes may also be applied to other reactors. For instance, the invention may be applied to reactors in which the cartridge does not contain a heat-exchange compartment, but only a reaction chamber traversed by a tubular nest of heat-exchange tubes, and also to reactors consisting only of a cartridge without an external force-resisting tube.

What is claimed is:

1. A reactor comprising a vertical catalysis cartridge, at least one tube for the conveyance of gases to be treated, said tube including an upper end and being supported within said cartridge by said upper end and extending in part downwardly through said cartridge, a first plurality of baffles supported by said cartridge transversely of said tube and defining a preheater chamber, a second plurality of baffles supported by said cartridge transversely of said tube and defining a reaction chamber adapted for housing a catalyst bed beneath said preheater chamber, said tube opening within said cartridge at the bottom of the reaction chamber so that the gases can flow upwardly through said chambers in heat exchange relationship with said tube within said cartridge, bypass means coupled to said cartridge and having an inlet opening substantially at the top of said reaction chamber for controlling the amount of gases passed from the reaction chamber through said preheater chamber, and exhaust means on the cartridge at the top of said preheater chamber, said bypass means bypassing around the preheater chamber to said exhaust means a percentage of the gases received from said reaction chamber.

2. A reactor as claimed in claim 1 wherein said bypass means defines a passage adjacent said preheater chamber and comprises a controllable valve in said passage for controllably venting the bypassed gases.

3. A reactor as claimed in claim 1 comprising a baffle supported on said cartridge between said chambers.

4. A reactor as claimed in claim 1 wherein the baffles in the preheater chamber are more closely spaced than the baffles in said reaction chamber.

5. A reactor as claimed in claim 1 wherein selected of said baffles are connected to said tube.

6. A reactor as claimed in claim 1 comprising a plurality of tubes for the conveyance of gases.

7. A reactor as claimed in claim 1 comprising an external casing surrounding and supporting the cartridge and spaced therefrom, said casing defining an inlet at the bottom of the cartridge for the admission of gases.

8. A reactor as claimed in claim 1 wherein said tube is connected to the top of the cartridge and thus to a relatively cool portion of the cartridge spaced from the reaction chamber.

References Cited in the file of this patent

UNITED STATES PATENTS

| | | |
|---|---|---|
| 1,900,857 | Berry | Mar. 7, 1933 |
| 1,909,442 | Williams | May 16, 1933 |
| 1,917,718 | Jewett | July 11, 1933 |
| 1,970,923 | Spalding | Aug. 21, 1934 |
| 2,051,774 | Kleinschmidt | Aug. 18, 1936 |
| 2,248,993 | Houdry | July 15, 1941 |
| 2,538,738 | Stengel | Jan. 16, 1951 |